United States Patent

[11] 3,577,709

[72] Inventor John G. Hoad
 Dearborn, Mich.
[21] Appl. No. 727,814
[22] Filed May 9, 1968
[45] Patented May 4, 1971
[73] Assignee John G. Hoad & Associates, Inc.
 Ypsilanti, Mich.

[54] GAS WASHER APPARATUS
 6 Claims, 3 Drawing Figs.
[52] U.S. Cl. .................................................. 55/228,
 55/435, 261/118, 261/3, 261/7
[51] Int. Cl. ....................................................... B01f 3/04
[50] Field of Search ........................................... 55/435,
 228; 261/3, 7, 8, 118; 15/249, 104.08, 246.5

[56] References Cited
UNITED STATES PATENTS

| 917,561 | 4/1909 | Double | 261/118X |
|---|---|---|---|
| 2,654,584 | 10/1953 | Hedberg | 261/115X |
| 2,913,116 | 11/1959 | Cover | 261/7X |
| 3,353,799 | 11/1967 | Lions et al. | 261/3 |
| 3,465,504 | 9/1969 | Oropeza et al. | 55/435X |
| 3,494,099 | 2/1970 | Eng et al. | (261/3UX) |

FOREIGN PATENTS

| 518,375 | 3/1953 | Belgium | 55/435 |

Primary Examiner—Tim R. Miles
Attorney—Olsen and Stephenson

ABSTRACT: A combined wet scrubber and clarifier or settling basin for removing dust and other particulate matter from exhaust gases associated with various metallurgical and chemical processes.

INVENTOR
JOHN G. HOAD

BY
*Olsen and Stephenson*
ATTORNEYS

GAS WASHER APPARATUS

BACKGROUND OF THE INVENTION

The present invention relates to apparatus for removing dust and other particulate matter from exhaust gases associated with various metallurgical and chemical processes. The sources of the gases may be rotary kilns as used in the cement, lime, expanded aggregate and similar processes, or such sources may be a cupola, blast furnace, or similar apparatus which discharges exhaust gases carrying particulate matter.

It is known in the prior art to provide gas scrubbing devices which employ a scrubber mounted over a settling tank or basin whereby water can be discharged countercurrent to gases passing through the scrubber, and the water carrying the particulate matter can then be collected in the settling tank for suitable disposition. However, the units which have been used in the past for this purpose have not proved to be entirely satisfactory. As is well known to those skilled in the art, the exhaust gases which pass into the scrubbing devices frequently and in most instances are hot and carry particulate matter which when combined with the water is corrosive. The prior art units have been rather complex in construction thereby making them rather costly, and in many instances they have been subject to excessive corrosive action because of their constructions. Also, they have not proved to be completely satisfactory in their ability to remove the particulate matter from the exhaust gases to an extent commensurate with their installation and operational cost.

SUMMARY OF THE INVENTION

The present invention has overcome the shortcomings of the prior art and comprises a single or multiple spray tower combined with a settling basin beneath. The spray tower is mounted directly over the settling basin so that the wash or spray water which is discharged therein falls by gravity directly into the settling basin. The dust laden gases pass upward through the spray tower countercurrent to the water flow and discharge as relatively clean gases through the top of the tower where exhaust is induced by a suitable exhaust gas fan or blower.

The spray tower comprises a steel shell which is lined with an elastic material, such as rubber or a suitable elastomer which can be distorted periodically by air inflation between the steel shell and the elastic lining in order to break off any accumulation or accretion of dust buildup on the lining. The inflation can be controlled manually or automatically by use of suitable control means actuated by a timer and programmed as required by operating conditions. The settling tank can be a conventional unit with a rake mechanism and drive, but so modified to permit the installation of the scrubber tower directly over the feed area to the tank. The spray water utilized by the scrubbing tower may be in part the effluent from the settling tank, and additional water can be supplied for spray purposes from a conventional water supply system.

The interior of the tower is preferably of a cylindrical shape and the elastic lining which is formed of a suitable noncorrosive material forms substantially the only area on which particulate matter from the exhaust gases can be deposited, and the inflatable characteristics of the lining permit this matter to be broken off and discharged at regular intervals to the settling tank. Thus, the tower is substantially free from internal construction where corrosive action of the exhaust gases can occur, or where the flow of the gases will be impeded. Also, the only surface where accumulation of dust can occur is constructed so that it can be freed from such accumulations as frequently as is necessary. Also, by virtue of the direction and controlled volume of liquid spray through which the gases are passed, essentially clean gases can be discharged from the exhaust outlet of the spray tower.

Thus, it is the primary object of the present invention to provide an improved gas scrubbing apparatus which can be used for removing or recovering entrained particulate matter from the gases.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
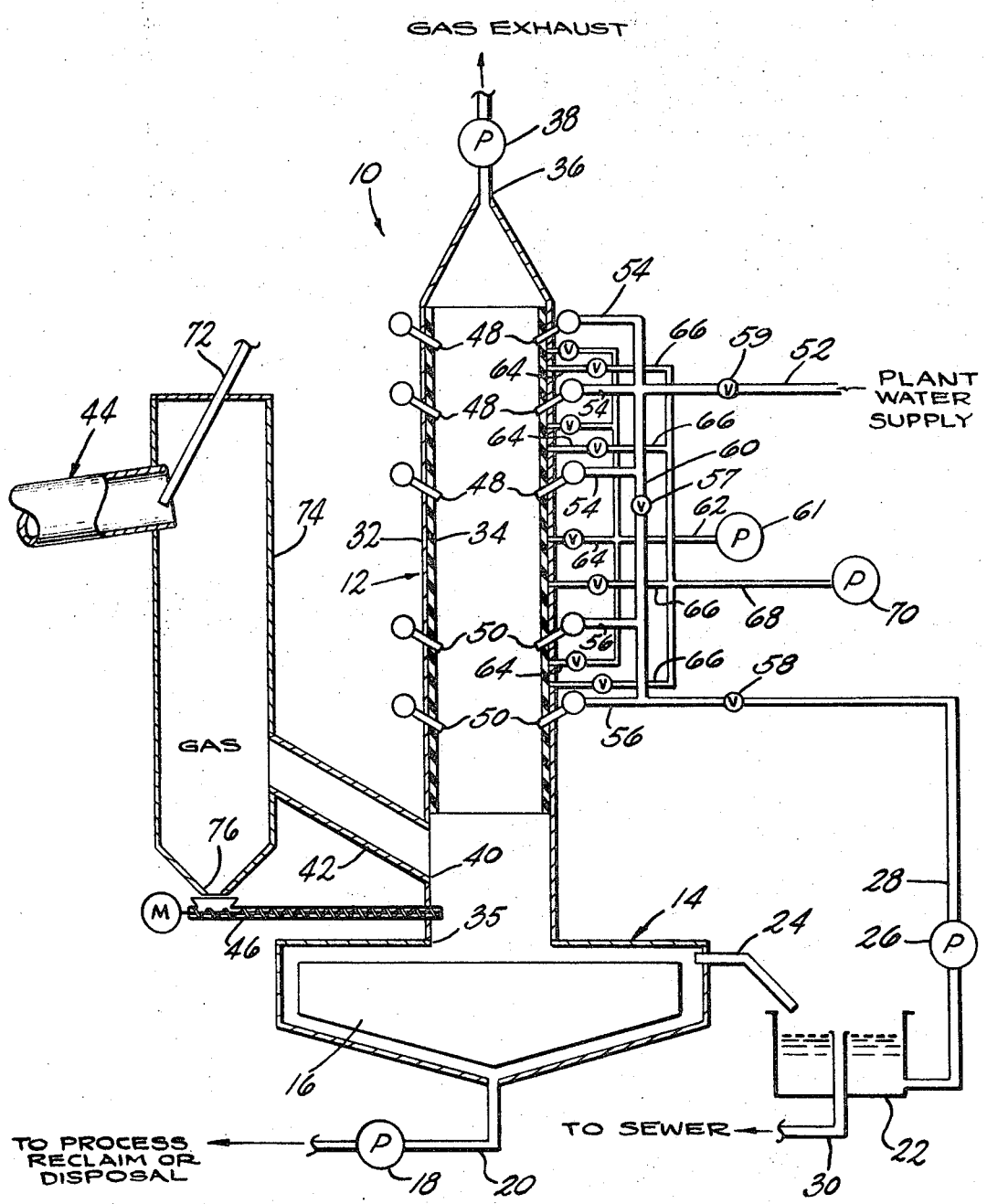
FIG. 1 illustrates schematically a combined wet scrubber and setting basin embodying the present invention including controls therefor and showing a fragmentary portion of a rotary kiln.

Referring now to FIG. 1, the invention will be described in greater detail. As there shown a combined wet scrubber and settling basin 10 is provided having a scrubber tower 12 positioned vertically over a settling basin 14. For the purposes of this description, the term "settling basin" should be understood to include any type of settling tank, clarifier tank or leaching tank, or the like, which may or may not have a rake mechanism and drive therefor, and which has been constructed so as to permit the installation of the scrubber tower 12 directly over the feed area of the settling basin 14.

The settling basin 14 has a conventional rake mechanism 16 and the settled solids are conveyed therefrom by means of the pump 18 and piping system 20 to a reclamation station or to other disposal areas. Effluent from the settling basin 14 flows to a reclaiming tank 22, via the outlet duct 24, where it is recycled to the scrubber tower 12 by pump 26 and piping system 28. A suitable overflow piping system 30 is provided which normally discharges to the sewer or other suitable disposal areas.

The scrubber tower 12 has an outer shell or casing 32 and an inner elastic liner 34 made from rubber or other suitable elastic materials. The tower 12 is open at the bottom to the opening 35 in the settling basin 14, and is open at the top at 36 to exhaust. A suitable exhaust blower or fan 38 is mounted at the upper end of the tower 12 for exhausting gases from the tower. The tower 12 also has an opening 40 adjacent to the bottom end thereof which is in communication with the passageway 42 leading from a rotary kiln 44, which will presently be described. Also extending into the bottom of the tower 12 is the screw conveyor 46 which will be described in conjunction with the rotary kiln.

From the preceding description, it will be understood that exhaust gases associated with the rotary kiln 44 or associated with other chemical or metallurgical processes can be discharged into the tower 12 through the opening 40 adjacent to the bottom thereof, and such gases will flow upwardly through the unobstructed passageway provided in the interior of the tower 12 and will be exhausted via the exhaust fan or blower 38.

Normally, the exhaust gases which enter the tower 12 through the opening 40 will contain a substantial amount of particulate matter associated with the process from which they originated. This particulate matter is removed from the dust laden gases by liquid spray which is introduced into the tower 12 countercurrent to the flow of such gases. The liquid spray is introduced through the interior of the tower by means of a plurality of spray nozzles which are in two sets, the first set, being identified by the numerals 48, which is located in the upper regions of the tower 12, and the second set, being identified by the numerals 50, which is located in the lower regions of the tower 12. In a preferred arrangement, the nozzles 48 receive water from an independent source via the conduit 52 and the conduits 54, and the nozzles 50 normally will receive effluent from the piping system 28 and the conduits 56. In some instances, it may be desired to discharge water from conduit 52 through all of the spray nozzles 48 and 50, and for this purpose the valve 57 is provided in the line 60 to permit flow of water from the conduit 52 to the conduits 56. When water is supplied in this manner valve 58 would be closed. Similarly, if it should be desired to discharge effluent only from all of the nozzles 48 and 50, the valve 59 in the conduit 52 can be closed and the valves 57 and 58 can be open so that such effluent can be directed to all the nozzles.

The height and diameter of the tower 12, the configuration, number and design of the spray nozzles 48 and 50, the quality of spray water and similar details will vary, depending upon the requirements of the particular system. Various factors such as the gas flow, gas temperature, dust load, particle size and distribution, desired collection efficiency and similar considerations will be determinative of the specific design that will be utilized. For example, in the case of a rotary kiln, as used in the Portland cement industry, the gas would be cooled to 200° F. or less at the exhaust fan 38 and enough water would be provided to produce a slurry in the settling basin 14 from 90 to 99 percent water. In all instances, the temperature of the exhaust gases must be considered and sufficient effluent or water must be sprayed onto the gases adjacent to the opening 40 to prevent heat damage to lining 34.

As previously indicated, the scrubber tower 12 is lined with elastic material 34, which is periodically inflated or distorted by air pressure or other suitable medium by a blower or compressor 61 which supplies the compressed air through the conduit 62 and conduits 64 for discharge into the space between the lining 34 and the outer steel shell or casing 32. After inflation or distortion, the flexible lining 34 is returned to its normal position by evacuating the air, used to inflate or distort the lining 34, through the valve controlled conduits 66 and the conduit 68 and vacuum pump 70. The valves in the conduits 64 from the blower 61 as well as the valves in the conduit 66 returning to the vacuum pump 70 can be manually controlled or they can be operated remotely, for example, by suitable solenoid valves or the like, which can readily be made a part of the control system for automatically setting the duration and frequency of inflating and contracting the lining to the extent necessary to provide optimum conditions of a dust free interior in the tower 12.

As previously indicated, a rotary kiln for use in producing Portland cement is shown at 44, which includes the conventional feed pipe 72 and the kiln feed end housing 74 through which the exhaust gas is passed, and dust from the kiln feed end housing will settle at the bottom thereof for discharge through the outlet 76 to the motor driven screw conveyor 46 for transfer to the settling basin 14 where such dust can be reclaimed via the piping system 20.

From the foregoing description it will be recognized that a very efficient and relatively simple combined scrubber tower and settling basin is provided. The lining 34, because of its inflatable characteristics will assure that the interior of the tower 12 remains substantially clean at all times, and the lining will prevent corrosive action from occurring to the steel shell or casing or to other components of the scrubber tower. Also, a water spray system is provided which can readily protect the lining and the tower from the hot temperatures of gases which may be passed through the tower, merely by increasing the volume of water sprayed into the tower so as to maintain the temperature within the tower at a selected maximum. The system also provides means for readily reclaiming the dust particles for reuse if this is desired or the particles can be disposed of in any other suitable manner desired.

Figure 2:
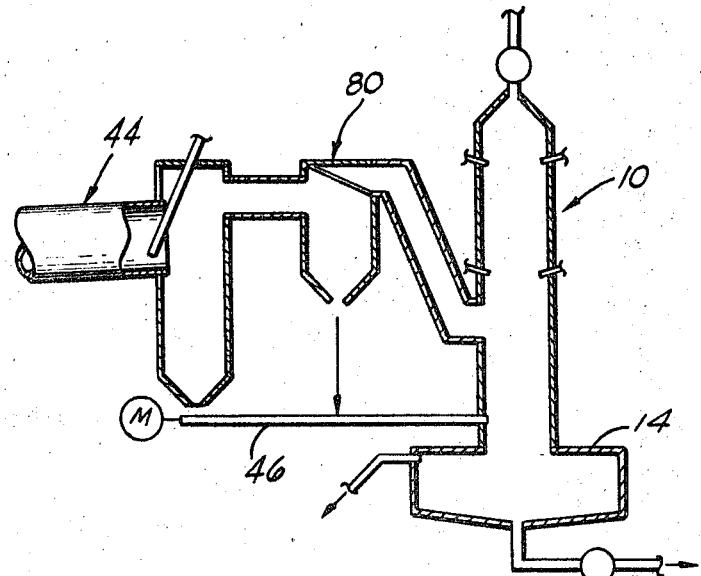
FIG. 2 is a schematic illustration of the present invention employed as a secondary scrubber.

In the embodiment of the invention described above, the combined scrubber tower and settling basin are positioned as the primary scrubber for the rotary kiln 44. The present invention may also be utilized in other arrangements, such as is shown in FIG. 2, wherein the combined scrubber tower and settling basin 10 are arranged to function as a secondary scrubber. As there shown, a mechanical dust collector of a conventional type is shown at 80. In this arrangement, if desired, the dust collected by the collector 80 can also be discharged directly to the motor driven conveyor 46 for discharge to the settling basin 14.

Figure 3:
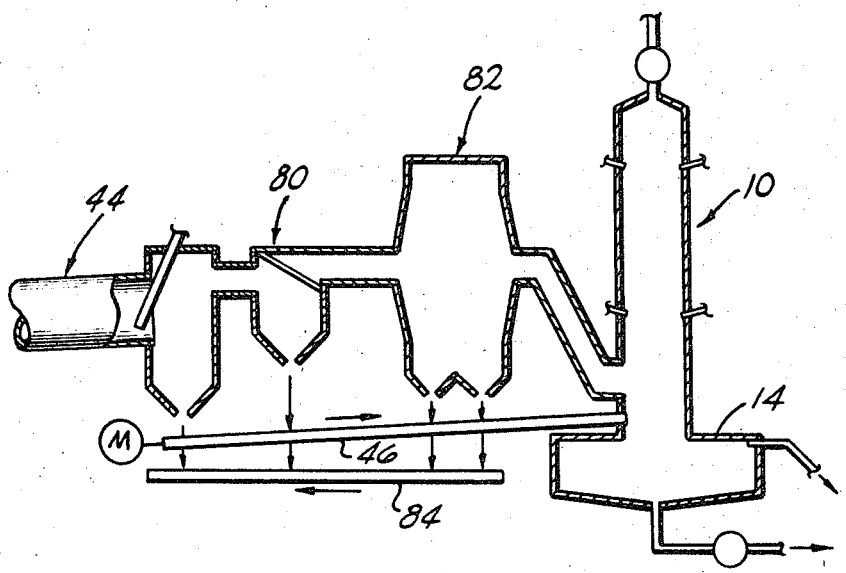
FIG. 3 is another schematic illustration of the present invention used as a tertiary scrubber.

FIG. 3 shows still another arrangement wherein the present invention can be employed in which the combined scrubber tower and settling basin 10 function as a tertiary scrubber. As there shown, a mechanical dust collector 80 can be used together with a conventional bag house or electrostatic precipitator 82, and as shown in this arrangement, the collected dust from the system can be discharged to the settling tank 14 via the motor driven screw 46 or it can be deposited in a second motor-driven screw conveyor 84 for discharge, as desired to a separate disposal area.

I claim:

1. Apparatus for recovering or removing entrained particulate matter from gases comprising a settling basin, and a wet scrubber mounted over said settling basin, said scrubber having a tower free of a bottom wall so as to be completely open at the bottom to said settling basin, open at the top to exhaust and open adjacent to its bottom to a source of said gases, liquid spray means mounted in said tower for spraying liquid countercurrent into contact with gases rising in said tower to remove the particulate matter therefrom by gravity directly to said settling basin, said tower having an outer shell and an elastic liner, first means for introducing a pressurized medium between said liner and said shell to distort said liner to remove accumulated matter therefrom for discharge by gravity directly to said settling basin, and second means for evacuating said pressurized medium from between said shell and said liner.

2. Apparatus according to claim 1, wherein control means are associated with said first and second means for selectively initiating and interrupting operation thereof.

3. Apparatus according to claim 1, wherein means are included for delivering effluent from said settling basin to at least some of said spray means.

4. Apparatus according to claim 1, wherein said liquid spray means are in two sets, one set being positioned in the upper portions of said tower and the other set being positioned below said one set and above the opening for receiving said gases, and means for delivering effluent from said settling basin to said other set.

5. Apparatus according to claim 4, wherein means are included for delivering liquid from a separate source of liquid to said one set.

6. Apparatus according to claim 1, wherein an exhaust blower is positioned at the top of said tower for exhausting gases from said tower through the opening at the top thereof.